Jan. 23, 1962 S. LOEWE ETAL 3,018,063

TAPE REEL DRIVE SYSTEM

Filed July 18, 1955

Inventors:

Siegmund Loewe

Robert Erwin Schulz

3,018,063
TAPE REEL DRIVE SYSTEM

Siegmund Loewe, 68 Ridge Road, Yonkers, N.Y., and Robert Erich Schulz, Berlin, Germany; said Schulz assignor to said Loewe Filed July 18, 1955, Ser. No. 522,506
Claims priority, application Germany July 27, 1954
4 Claims. (Cl. 242—55.12)

Figure 1:
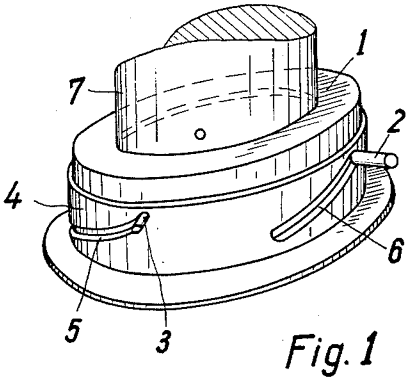

This invention is directed to a mechanism for driving sound record tapes which includes means for high-speed operation. Such devices are designed e.g. so that the magnet tape which is moved by a capstan is reeled off a supply reel and is wound onto another reel. In order to take care of the different winding diameters occurring and the continuous change of the rotary speed of the reels caused thereby despite constant running speed of the tape, it is necessary to provide friction layers lying between a reel carrier and a driving disc which is rotatable and connected, for this purpose, with a motor. For realizing differently high tape speeds it is necessary to reduce the friction formed between the reel carrier and the driving disc in case said reel carrier is drawn (wound-off) by the other reel, and the driving disc is not driven by the motor. This problem is solved on a known embodiment of a magnet tape device by providing a structural element axially displaceable relative to the tape reel and which lifts the reel carrier from its normal friction layer and causes it to cooperate, instead, with a smaller friction layer than that acting in normal operation.

In solving the described problem in the mentioned connection, lever constructions are known for lifting the structural element movable in direction of the reel axis; they have the basic disadvantage that, on the one side, they are not rigidly enough connected to the operation or gear element initiating this movement,, and, on the other side, they do not guarantee an exact parallel movement in this axial displacement.

The present invention solves the problem to effect in general on the initially described friction connections of rotatable elements and in particular in their application in connection with the reel drive in magnet tape devices, a movement which is perfectly parallel to the plane of rotation of the elements which are in frictional connection with each other along their joint axis, this movement being used for controlling the pressure between the elements which are in frictional connection with each other. Thus, the subject matter of this invention consists in a sound record driving mechanism comprising in combination: a disc-shaped first tape reel carrier, a rotatable, motor-driven first disc frictionally coupled with said tape reel carrier, a first friction layer arranged between said tape reel carrier and said first disc, a second disc parallel to said first disc, a second friction layer arranged on the surface of said second disc, said second friction layer having a smaller surface than said first friction layer, said first and said second disc being coaxially arranged on a non-rotatable shaft in such a manner that said first friction layer is normally in contact with said tape reel carrier, and said second friction layer being arranged at a small distance from said tape reel carrier, means for axially shifting one of said discs along said shaft into a position in which said tape reel carrier is lifted from said first friction layer and lying on said second friction layer, said shifting means consisting of two concentric cylinders surrounding said shaft, several circumferentially uniformly spaced guiding surfaces arranged on one of said cylinders obliquely to said shaft, several radial pins being arranged on the other cylinder each of which lies on one of said guiding surfaces, one of said cylinders being rotatable and connected with said second disc. Shifting means of this kind where known in connection with braking arrangements in machines.

Figure 2:
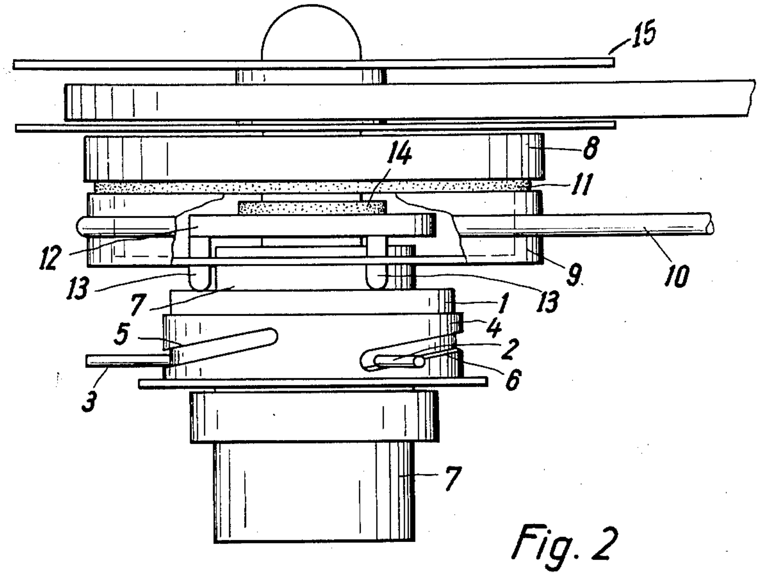

The nature of the invention and further details and embodiments thereof are illustrated in the accompanying drawings, in which FIG. 1 is a perspective view showing an embodiment of the shifting means according to the invention, FIG. 2 is an elevational view showing a complete driving mechanism of a magnetic tape device wherein the invention is realized.

In FIG. 1 the wedge-like acting structural elements are provided respectively on one or two of two cylinders 1 and 4 lying concentrically to a common shaft 7. Thereat, one of these cylinders, 1, is constructed rotatable and shiftable about this shaft 7, while the other cylinder, 2, is non-rotatable and non-shiftable. Cylinder 1, when shifted, remains parallel to the plane extending vertically to its axis without tilting or jamming. For this purpose, the cylinder 1 is provided with at least three circumferentially uniformly spaced radial guiding parts, preferably in the form of outwardly projecting pins of which the pins 2 and 3 are shown in the drawing. The cylindrical structural element, furthermore, is positioned in a cylinder coaxially thereto supported and designated by 4 having inclined slots 5 and 6 which serve as guides for the pins 2 and 3. In rotating one of the cylinders, e.g. the cylinder 1, this cylinder 1 is uniformly lifted without tilting or jamming.

According to FIG. 2 the shifting means 1 to 6, as shown in FIG. 1, are arranged on the common shaft 7. The upper end of this shaft 7 is surrounded by a tape reel carrier 8 for a tape reel 15. This carrier lies on a first disc 9 which is coupled with a driving motor (not shown) by a belt 10, and which drives the reel carrier 8 for the case of normal speed in the known manner. At its periphery the disc 9 has a flange bent upwardly. A friction layer 11, preferably ring-shaped, is arranged between the reel carrier 8 and the driving disc 9. A second disc 12 is arranged in the inner part of said first disc 9 and is provided with three axe-parallel lugs 13 projecting through holes of said first disc 9 and lying on the cylinder 1 of the shifting means 1 to 6. The upper surface of said second disc 12 has a ring-shaped friction layer 14 which is smaller than the friction layer 11. A second mechanism (not shown) designed according to the parts 1 to 15 of FIG. 2 cooperates with said first mechanism in the usual manner.

In case the tape reel carrier 8 is to be rotated at high speed and is drawn by the reel of the second mechanism, the cylinder 1 is lifted up, e.g. by a peripheral motion of one of the pins 2, 3. By this lifting movement the second disc 12 with its friction layer 14 is lifted, too, into a position in which the tape reel carrier 8 is removed from its friction coupling with the first disc 9 and rests on said layer 14. In this position the first disc 9 does not rotate.

What we claim is:

1. A sound record tape driving mechanism including means for high-speed operation, said mechanism comprising in combination: a disc-shaped tape reel carrier, a rotatable, motor-driven first disc frictionally coupled with said tape reel carrier, a first friction layer arranged between said tape reel carrier and said first disc, a second disc parallel to said first disc, a second friction layer arranged on the surface of said second disc, said second friction layer having a smaller surface than said first friction layer, said first and said second disc being coaxially arranged on a non-rotatable shaft in such a manner that said first friction layer is normally in contact with said tape reel carrier, and said second friction layer being arranged at a small distance from said tape reel carrier, means for axially shifting one of said discs along said shaft into a position in which said tape reel carrier is lifted from said first friction layer and lying on said second friction layer, said shifting means consisting of two concentric cylinders surrounding said shaft, several circumferentially uniformly spaced guiding surfaces being arranged on one of said cylinders obliquely to said shaft, several radial pins being arranged on the other cylinder each of which lies on one of said guiding surfaces, one of said cylinders being rotatable, and the other of said cylinders being shiftable along said shaft and connected with said second disc.

2. A mechanism according to claim 1, containing three guiding surfaces and three pins.

3. A mechanism according to claim 1, in which said guiding surfaces are shaped as slots through which said radial pins project.

4. A mechanism according to claim 1, in which said first disc has a flange bent upwardly and carrying said first layer, and said second disc is arranged within said flange, lugs arranged parallel to said shaft being fastened on said second disc, projecting through said first disc and lying on said rotatable cylinder of said shifting means.

References Cited in the file of this patent

UNITED STATES PATENTS

| | | |
|---|---|---|
| 646,305 | Morrow | Mar. 27, 1900 |
| 1,107,588 | Christie | Aug. 18, 1914 |
| 1,685,310 | Burrell et al. | Sept. 25, 1928 |
| 1,706,876 | Dunn | Mar. 26, 1929 |
| 1,869,436 | Pederson | Aug. 2, 1932 |
| 2,012,437 | Segal | Aug. 27, 1935 |
| 2,574,204 | Woody et al. | Nov. 6, 1951 |
| 2,574,218 | Lynch | Nov. 6, 1951 |
| 2,589,660 | Bauman et al. | Mar. 18, 1952 |